Aug. 28, 1923.
A. C. MASON
1,466,379
SELECTIVE PULLEY CONTROL MECHANISM
Filed Feb. 6, 1922
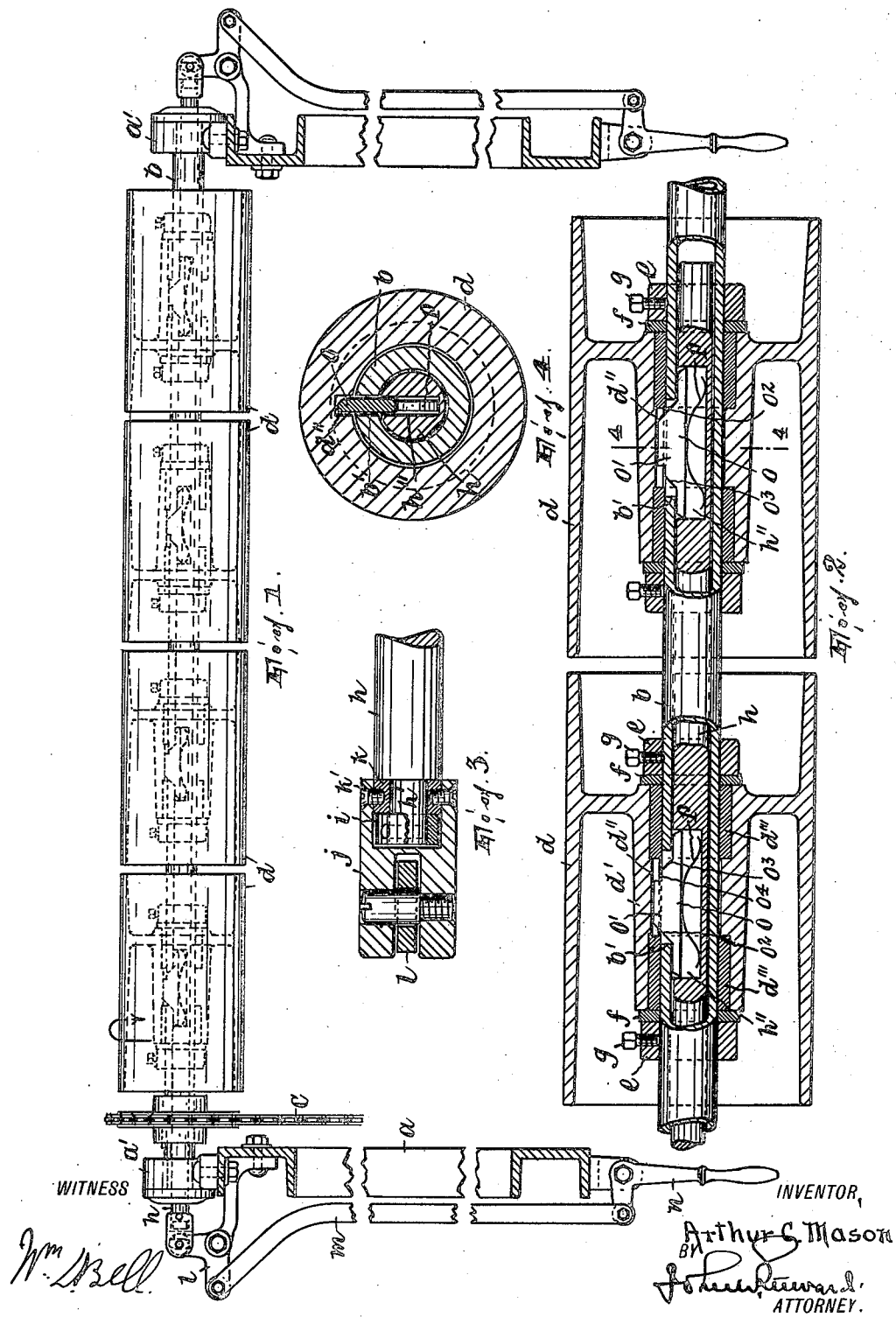
WITNESS
INVENTOR,
Arthur C. Mason,
BY
ATTORNEY.

Patented Aug. 28, 1923.

UNITED STATES PATENT OFFICE.

ARTHUR C. MASON, OF HAWTHORNE, NEW JERSEY.

SELECTIVE PULLEY-CONTROL MECHANISM.

Application filed February 6, 1922. Serial No. 534,596.

*To all whom it may concern:*

Be it known that I, ARTHUR C. MASON, a citizen of the United States, residing at Hawthorne, in the county of Passaic and State of New Jersey, have invented certain new and useful Improvements in Selective Pulley-Control Mechanisms, of which the following is a specification.

In certain instances where a pair of rotary members, as beams, are journaled on the same axis it is desirable to render them at will either both loose, both fast, or either of them fast and the other loose on their supporting shaft. The present invention consists in an improved mechanism wherein this selective control of the rotary members is made possible. The invention is illustrated and described herein as applied to the take-up means of a fabric shearing machine, for instance, such as is shown in my application Serial Number 486,026, but it is to be understood as applicable to an instance in which a pair of rotary members are journaled on the same axis and are desired to be selectively controlled as stated.

In the drawing,

Fig. 1 is a plan of the invention, showing in section a part of a fabric-shearing machine designed for shearing four fabrics at once;

Fig. 2 is a longitudinal sectional view through one of the pair of take-up beams or pulleys of such a machine and those parts with which the invention is directly concerned;

Fig. 3 is a sectional view of a detail; and

Fig. 4 is a sectional view on line 4—4, Fig. 2.

In the frame $a$ is journaled in bearings $a'$ a hollow shaft $b$ which in this example is rotated by the sprocket-and-chain means $c$. There are two pairs of pulleys or beams $d$ journaled on this shaft. The pairs of pulleys and the control mechanisms appertaining thereto are substantially identical, so the following description of one of these organisms will serve for both.

In the bearing or hub $d'$ of each pulley is formed an interior key-seat $d''$, here in the form of a groove. (The parts $d'''$ both sides of this groove are simply anti-friction bearing thimbles.) Each pulley is arranged to rotate on the shaft $b$ between collars $e$ and washers $f$, the collars being held by set-screws $g$.

The shaft $b$ has in transverse coincidence with each pulley key-seat $d''$ an opening here in the form of a slot $b'$ somewhat longer than the groove.

The hollow shaft $b$ contains a shaft or spindle $h$ capable of movement longitudinally therein. For moving this spindle there is provided the following mechanism: One end of the spindle protrudes from shaft $b$ and is reduced, as at $h'$, and has pinned thereon a head $i$ over which is slipped the bored-out end of a clevis $j$ which has held in the mouth of its bore by screws $k'$ a collar $k$, thus forming a swivel joint between the spindle and clevis. In the fork or jaw of the clevis is pivoted one end of a bell-crank lever $l$ which is fulcrumed in the frame $a$ and is connected by a pitman $m$ with a manually operated lever $n$ fulcrumed in said frame.

The spindle is formed with longitudinal elongated recesses or housings $h''$, which extend only part way through the spindle but each of which is somewhat longer than the corresponding slot $b'$. Each housing contains a key or gib of peculiar form, the same being flat and received by the slot $b'$ and adapted to enter the key-seat $d''$ to lock the corresponding pulley to shaft $b$. Each key has an elongated base $o$, greater in length than slot $b'$ but approximating in length the housing, and a lateral hump $o'$ which has endwise bevels $o^2$ $o^3$. The keys are of the same length, approximately, as the housings, and so they are confined to move with the spindle in each direction, although free to move radially outwardly and inwardly therein. They are spaced apart differently from what the slots $b'$ are—in the present case slightly further than the slots. The keys are counterparts of each other, but they stand in their housings $h''$ relatively reversed.

In each housing, back of the key or gib, is a spring $p$, which tends to hold the latter pressed outwardly with its base end bearing against the inner surface of the spindle and its hump penetrating slot $b'$ and so engaged in the key-seat $d''$ when the latter registers with the slot.

It will be understood that in the position of the parts shown by Fig. 2, which shows the spindle $h$ in its mid-position, the pulleys are both locked to the shaft so as to rotate therewith because the keys project into the key-seats $d''$; it will be observed further that on account of the superior spacing of the keys compared with that of the slots $b'$ the outer bevels $o^2$ of the key humps are near the outer ends of the slots, whereas the inner bevels $o^3$ are appreciably spaced from the inner ends of the slots. If the spindle be shifted in either direction a certain distance (to wit, to take up the clearance between the inner bevel $o^3$ of one key hump and the inner end of the corresponding slot) there will occur the unlocking of one pulley as the corresponding key-hump-bevel $o^2$ wipes against the outer end of its slot $b'$, but the other pulley will remain locked; if, however, the shifting in said direction be made to exceed this distance the latter pulley will also be unlocked, due to the key-hump-bevel $o^3$ corresponding thereto being now caused to wipe against the inner end of its slot. Thus, the operator can not only set both pulleys or one and not the other in locked relation to the shaft, but he can quickly effect a change from either of these conditions to that where both pulleys are unlocked. In a fabric shearing machine such as I have referred to, where the pulleys are elements of several take-up mechanisms for as many fabrics to be sheared, my improvements are of great advantage, especially because they make it possible for the attendant to stop one or more of the said mechanisms quickly if the feed of a fabric or fabrics should for any reason be interrupted and to start the same again without undue loss of time. It will be understood that the locking and unlocking operations are all effected by shifting the hand lever $n$.

Where, as shown in Fig. 1, there are two pairs of pulleys to be controlled it will be convenient to provide two sets of manually operated but relatively reversed controlling means $l$, $m$, $n$ and spindles $h$, for the two pairs of keys $o$.

The notches $o^4$ shown in the keys afford stops limiting the movement of the spindle beyond either position where both pulleys would stand unlocked, the stops being adapted to abut the ends of openings $b'$.

Having thus fully described my invention, what I claim as new and desire to secure by Letters Patent is:—

1. In combination, an axial support, a pair of rotary members journaled in the support, separate devices for disconnectively connecting the respective members with the support, each device being shiftable from one to the other of positions for respectively connecting and leaving unconnected the support and said member, and means, including a controlling member movable from an intermediate position in either of two opposite directions, for shifting first one and then both of said devices into one of said positions on movement of the controlling member in each direction.

2. In combination, a hollow shaft, a pair of rotative members journaled on the shaft a definite distance apart, said members having interior key-seats and the shaft having openings arranged in coincidence therewith transversely of the shaft, a spindle movable in and longitudinally of the shaft, and a pair of keys each confined to move with the spindle longitudinally of the shaft and engaged in the corresponding openings and spring-urged outwardly and thereby adapted to enter the key seat of the corresponding member, said keys having the portions received by and of less extent than the openings longitudinally of the shaft and being also spaced apart differently from what the openings are spaced apart and having endwise bevels engageable with the ends of the openings.

In testimony whereof I affix my signature.

ARTHUR C. MASON.